United States Patent [19]
Chen

[11] Patent Number: 5,931,550
[45] Date of Patent: Aug. 3, 1999

[54] EASILY ASSEMBLED/DISASSEMBLED COMPUTER MAIN FRAME HOUSING

[75] Inventor: Feng-Ming Chen, Chung Ho, Taiwan

[73] Assignee: Chenbro Micom Co., Ltd., Taipei Hsien, Taiwan

[21] Appl. No.: 09/146,340

[22] Filed: Sep. 2, 1998

[30] Foreign Application Priority Data

May 5, 1998 [TW] Taiwan ................................. 87206951

[51] Int. Cl.⁶ .................................................. A47B 47/00
[52] U.S. Cl. .................... 312/244; 312/223.2; 312/265.5; 361/683
[58] Field of Search ............................. 312/223.2, 223.1, 312/265.1, 265.2, 265.3, 265.4, 265.5, 265.6, 244; 220/4.32, 772, 769, 761; 190/107, 116; 361/683, 724, 725, 726, 727

[56] References Cited

U.S. PATENT DOCUMENTS

| | | | |
|---|---|---|---|
| 4,886,163 | 12/1989 | Hubbell et al. ...................... | 190/107 X |
| 5,031,070 | 7/1991 | Hsu . | |
| 5,162,976 | 11/1992 | Moore et al. . | |
| 5,197,789 | 3/1993 | Lin ....................................... | 312/223.2 |
| 5,491,611 | 2/1996 | Stewart et al. ................... | 312/223.2 X |
| 5,593,219 | 1/1997 | Ho ..................................... | 312/223.1 X |
| 5,777,848 | 7/1998 | McAnally et al. ............... | 312/223.2 X |
| 5,796,585 | 8/1998 | Sugiyama et al. ............... | 312/223.2 X |
| 5,808,871 | 9/1998 | Rosecan et al. .................. | 312/265.1 X |
| 5,825,614 | 10/1998 | Kim ...................................... | 361/683 |
| 5,839,804 | 11/1998 | Ho ..................................... | 312/265.6 X |
| 5,845,977 | 12/1998 | Neukam et al. ..................... | 312/108 X |
| 5,845,978 | 12/1998 | Jung ....................................... | 312/244 |

Primary Examiner—Peter M. Cuomo
Assistant Examiner—Hanh V. Tran
Attorney, Agent, or Firm—Rosenberg Klein & Bilker

[57] ABSTRACT

An easily assembled/disassembled computer main frame housing including: a base casing formed as a hollow frame body by a front, a rear, an upper and a lower panels which are sequentially interconnected with each other; two lateral walls respectively sealedly engaged with left and right sides of the base casing, an edge of each lateral wall being pivotally connected with a handle for a user to grip; and a top cover board slidably latched on the upper panel of the base casing for preventing the lateral walls from being moved upward and unlatched from the base casing. After disassembling the top cover board, a user can hold the handles with hands and draw out and disassemble the lateral walls or slidably latch and assemble the lateral walls with two sides of the base casing.

2 Claims, 8 Drawing Sheets

EASILY ASSEMBLED/DISASSEMBLED COMPUTER MAIN FRAME HOUSING

BACKGROUND OF THE INVENTION

The present invention relates to an easily assembled/disassembled computer main frame housing in which two lateral walls are pivotally connected with two handles for a user to hold so as to easily disassemble the lateral walls or assemble the lateral walls with two sides of the base casing of the housing.

The housing of a computer main frame is composed of several panels or casings which are detachably locked with each other. FIG. 1 shows an existing upright-type computer housing which includes a base seat 5, a top cover 6 and two lateral covers 7. The lateral edges of each lateral side 52 of the base seat 5 are respectively formed with insertion flanges 520. Each insertion flange 520 is formed with at least one insertion slot 56. The bottom edge of the lateral side 52 is disposed with an engaging flange 57. Two sides of each lateral cover 7 are disposed with projecting insertion pins 71 corresponding to and inserted in the insertion slots 56. The bottom edge of the lateral cover 7 is disposed with an engaging channel 72 corresponding to and engaged with the engaging flange 57. The top cover 6 and the lateral covers 7 are engaged with the base seat 5 to form the computer main frame housing. According to the above arrangement, some shortcomings exist in the assembling procedure as follows:

1. The insertion pins 71 on two sides of the lateral cover 7 must be aligned with and inserted into the insertion slots 56 of the base seat 5 one by one. The dimension of the insertion slot 56 is quite small so that it is inconvenient to assemble the lateral covers 7 with the base seat 5.

2. The lateral cover 7 is not equipped with a grip section for holding so that in assembling, a user often tightly grips the lateral edges of the lateral cover 7 with the fingers of both hands. In assembling or disassembling procedure, it is difficult for the user to take or remove the lateral cover 7 and the lateral cover 7 is apt to slip away and drop down. Moreover, the lateral edge of the lateral cover 7 is formed by a thin metal sheet so that it often takes place that the user's fingers are incautiously cut by thin metal sheet.

SUMMARY OF THE INVENTION

It is therefore a primary object of the present invention to provide an easily assembled/disassembled computer main frame housing including: a base casing formed as a hollow frame body by a front, a rear, an upper and a lower panels which are sequentially interconnected with each other; two lateral walls respectively sealedly engaged with left and right sides of the base casing, an edge of each lateral wall being pivotally connected with a handle for a user to grip; and a top cover board slidably latched on the upper panel of the base casing for preventing the lateral walls from being moved upward and unlatched from the base casing. After disassembling the top cover board, a user can hold the handles with hands and draw out and disassemble the lateral walls or slidably latch and assemble the lateral walls with two sides of the base casing.

The present invention can be best understood through the following description and accompanying drawings, wherein:

DETAILED DESCRIPTION OF THE PREFERRED EMBODIMENT

Figure 1:
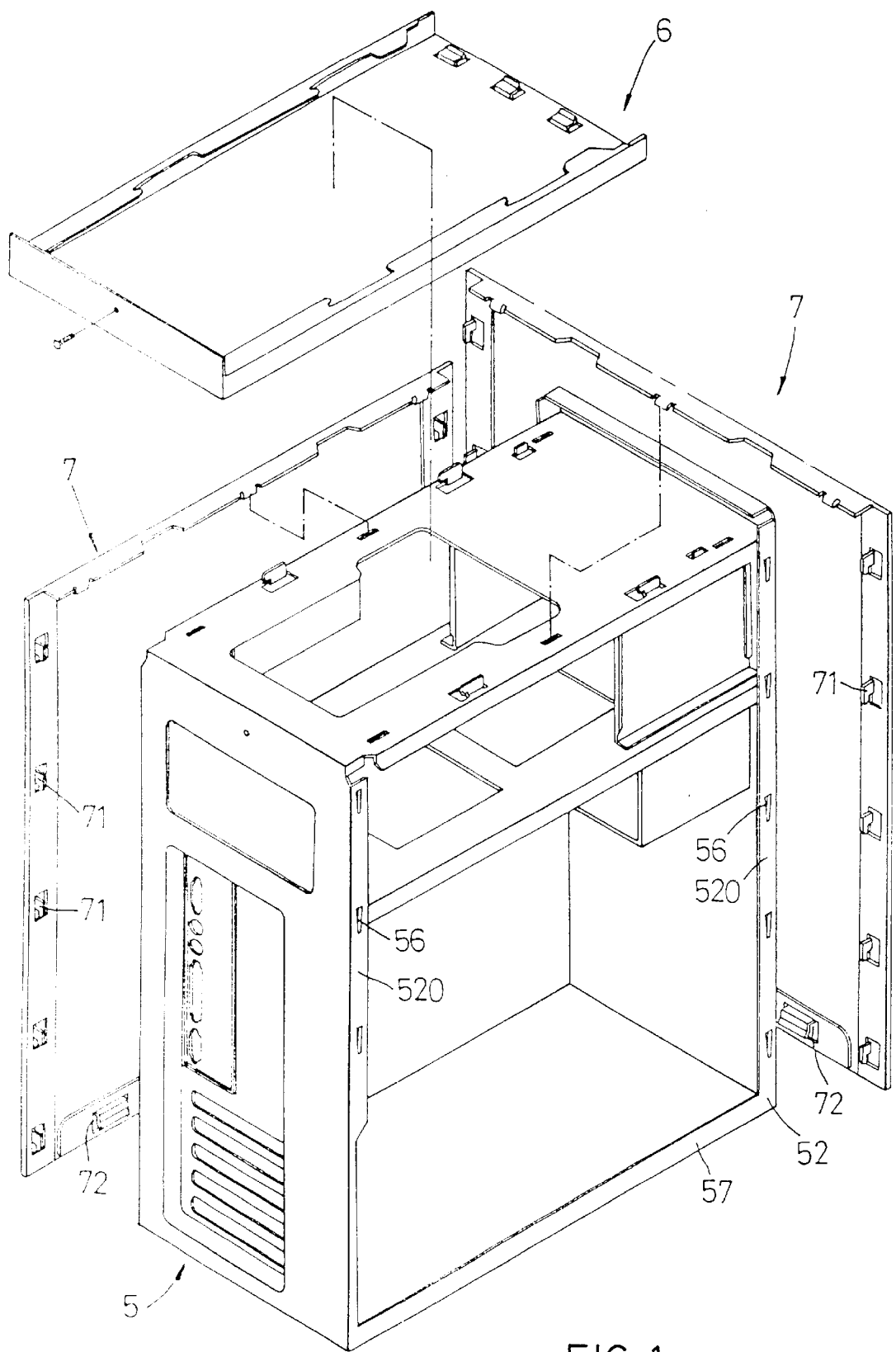
FIG. 1 is a perspective exploded view of a conventional computer main frame housing.

Please refer to FIGS. 2 to 8. The computer main frame housing 100 of the present invention includes: a base casing 1 formed as a hollow frame body by a front panel 11, an upper panel 12, a rear panel 13 and a lower panel 14 which are sequentially interconnected with each other; two lateral walls 2 respectively engaged with a left and a right open sides 1a, 1b of the base casing 1, an edge of each lateral wall 2 being pivotally connected with a handle 223 for a user to hold and take the lateral wall 2; and a top cover board 3 slidably latched on the upper panel 12 of the base casing 1 for preventing the lateral walls 2 from being unlatched from the base casing 1. Accordingly, a user can hold the handle 223 of the lateral wall 2 to draw or disassemble the lateral walls 2 or slidably latch and assemble the lateral walls 2 with two sides of the base casing 1.

The base casing 1 is made of one single metal sheet by integral punching. Two sides of the upper and lower panels 12, 14 are respectively formed with skirt sections 121, 141 bent toward the center of the base casing 1. The skirt sections 121, 141 are disposed with multiple outward projecting resilient forcing plates 121a, 141a for resiliently abutting against the lateral walls 2. Each side of the upper panel 12 is formed with at least one hook hole 122 for correspondingly hooking with a downward bent latch hook 221 formed on upper edge of the lateral wall 2. The upper panel 12 is formed with at least one latch hole 123 for correspondingly latching with the latch plate 312 disposed at bottom end of the top cover board 3.

Referring to FIGS. 2 to 6, each lateral wall 2 includes: a panel body section 21 for covering the open side 1a, 1b of the base casing 1, the bottom end of the panel body section 21 being disposed with multiple inward downward extending latch hooks 211 for engaging with and embracing the skirt section 141 of the lower panel 14 of the base casing 1; and a top panel section 22 extending from the top edge of the panel body section 21 toward the base casing 1 for bridging over the upper panel 12, the edge of the top panel section 22 being disposed with at least one downward extending latch hook 221 for correspondingly latching with the hook hole 122 of the upper panel 12 so as to firmly engage the lateral wall 2 with one side of the base casing 1. The top panel section 22 is formed with a pair of recessed pivot seats 222 which are pivotally connected with a handle 223 via a pivot pin 220. When turned to a horizontal state, the handle 223 is hidden in a handle receptacle 124 of the upper panel 12.

Figure 3:
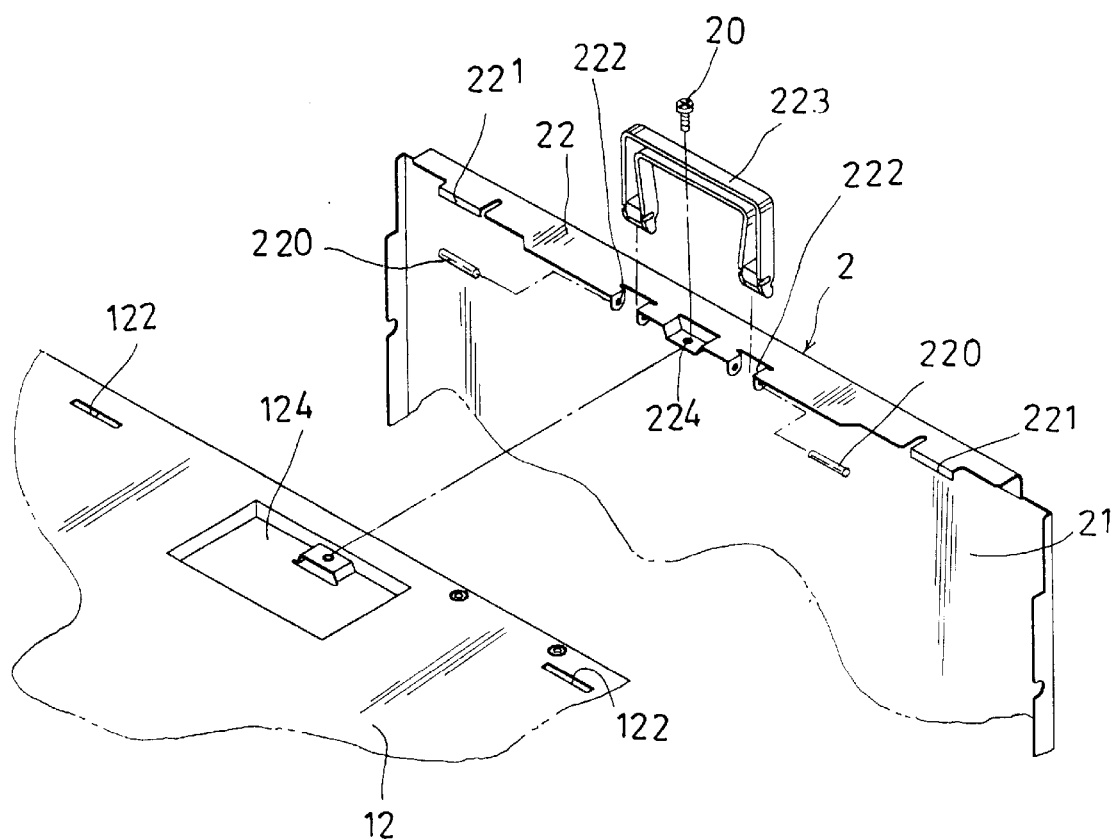
FIG. 3 is a partially exploded view of the lateral wall and the base casing of the present invention.
Figure 6:
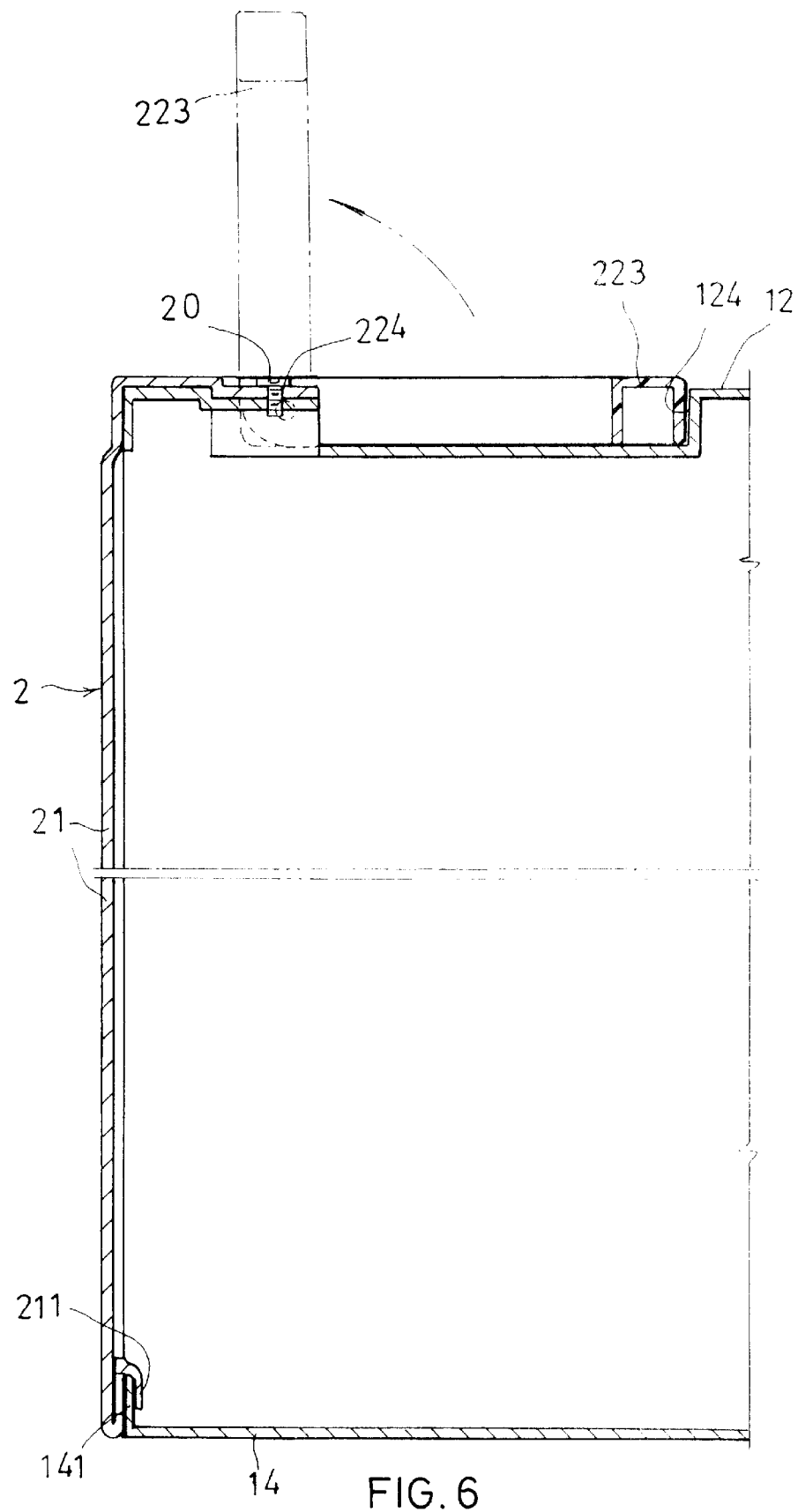
FIG. 6 is a sectional view taken along line 6—6 of FIG. 5.
Figure 7:
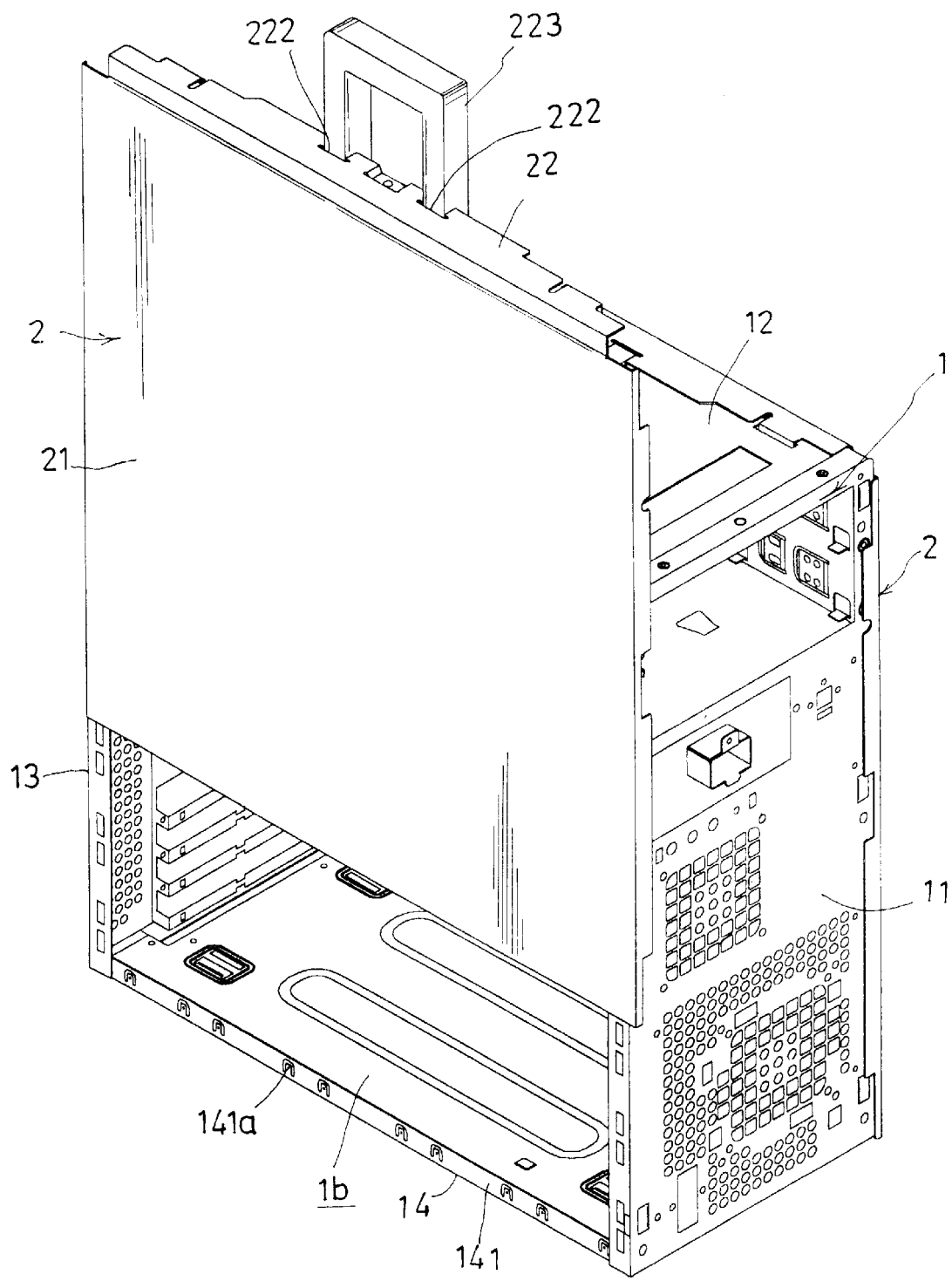
FIG. 7 is a view according to FIG. 5, in which a lateral wall is drawn upward.

Referring to FIGS. 3 and 6, the top panel section 22 of the lateral wall 2 is formed with a coupling hole 224 through which a fastening screw 20 is passed to be tightened in a thread hole 125 of the upper panel 12. This makes the lateral walls 2 firmly engaged and locked with two sides of the base casing 1.

Figure 2:
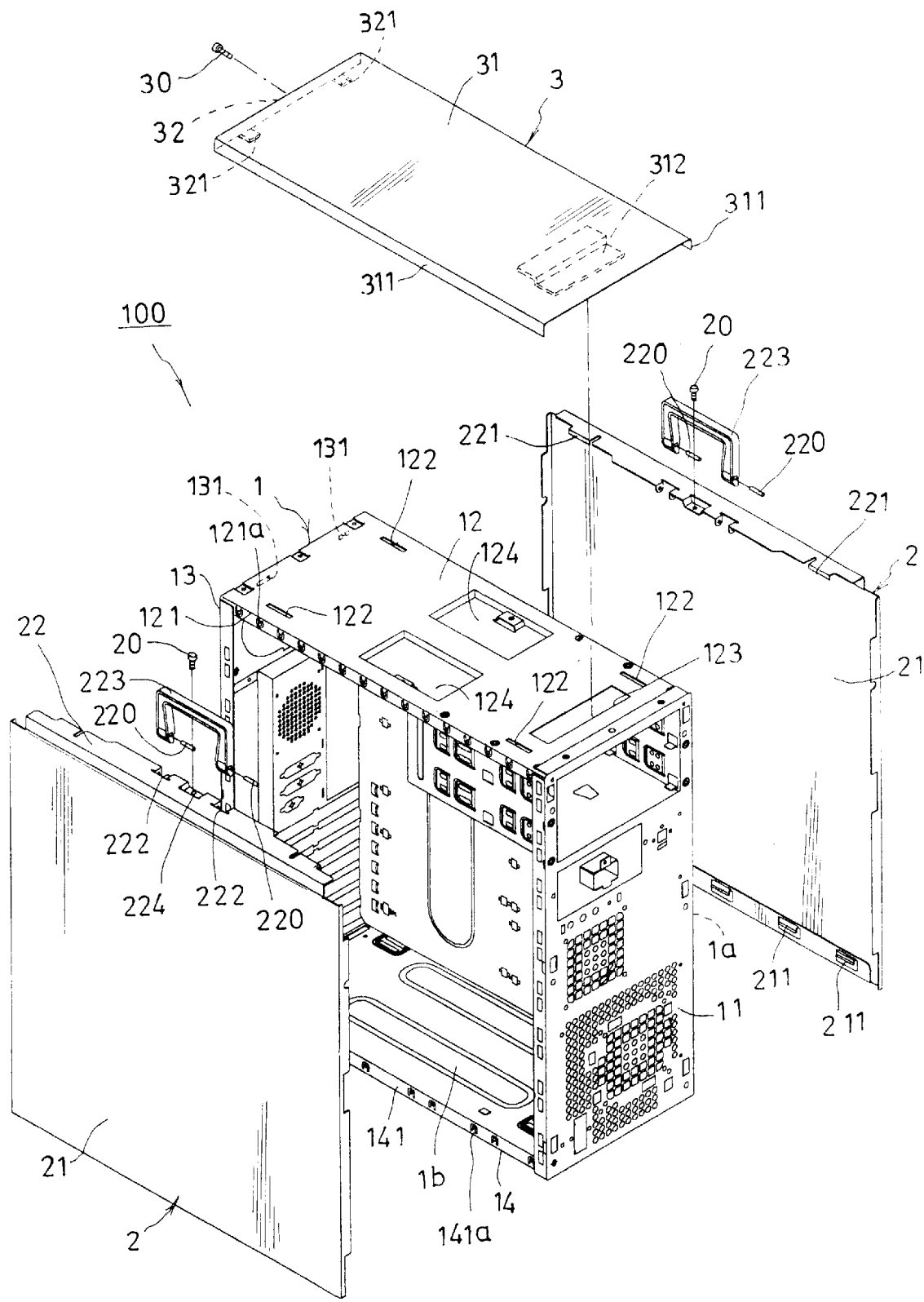
FIG. 2 is a perspective exploded view of the present invention.
Figure 8:
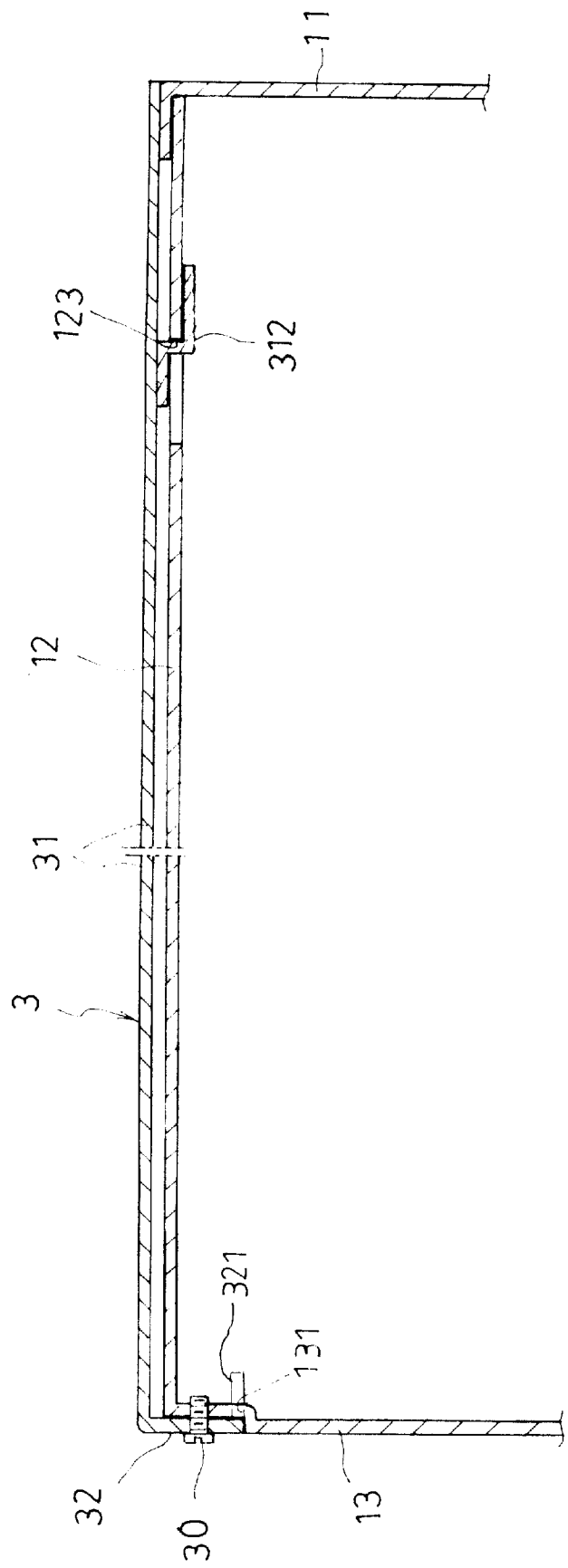
FIG. 8 is a sectional view taken along line 8—8 of FIG. 4.

Referring to FIGS. 2 and 8, the top cover board 3 includes a board body 31. Each side of the board body 31 is formed with a downward bent flange 311 for embracing the lateral wall 2. The bottom end of the board body 31 is disposed with at least one latch plate 312. The latch plate 312 is passed through the corresponding latch hole 123 and slidably latched with the outer edge of the latch hole 123, whereby the top cover board 3 is firmly bridged over and engaged with the upper panel 12. A rear side of the top cover board 3 has a downward extending tongue plate 32 which is locked on the rear panel 13 of the base casing 1 by screw 30. Alternatively, at least one latch plate 321 inward extends from the tongue plate 32 for correspondingly inserting into a latch hole 131 of the rear panel 13 for stabilizing the top cover board 3.

Figure 4:
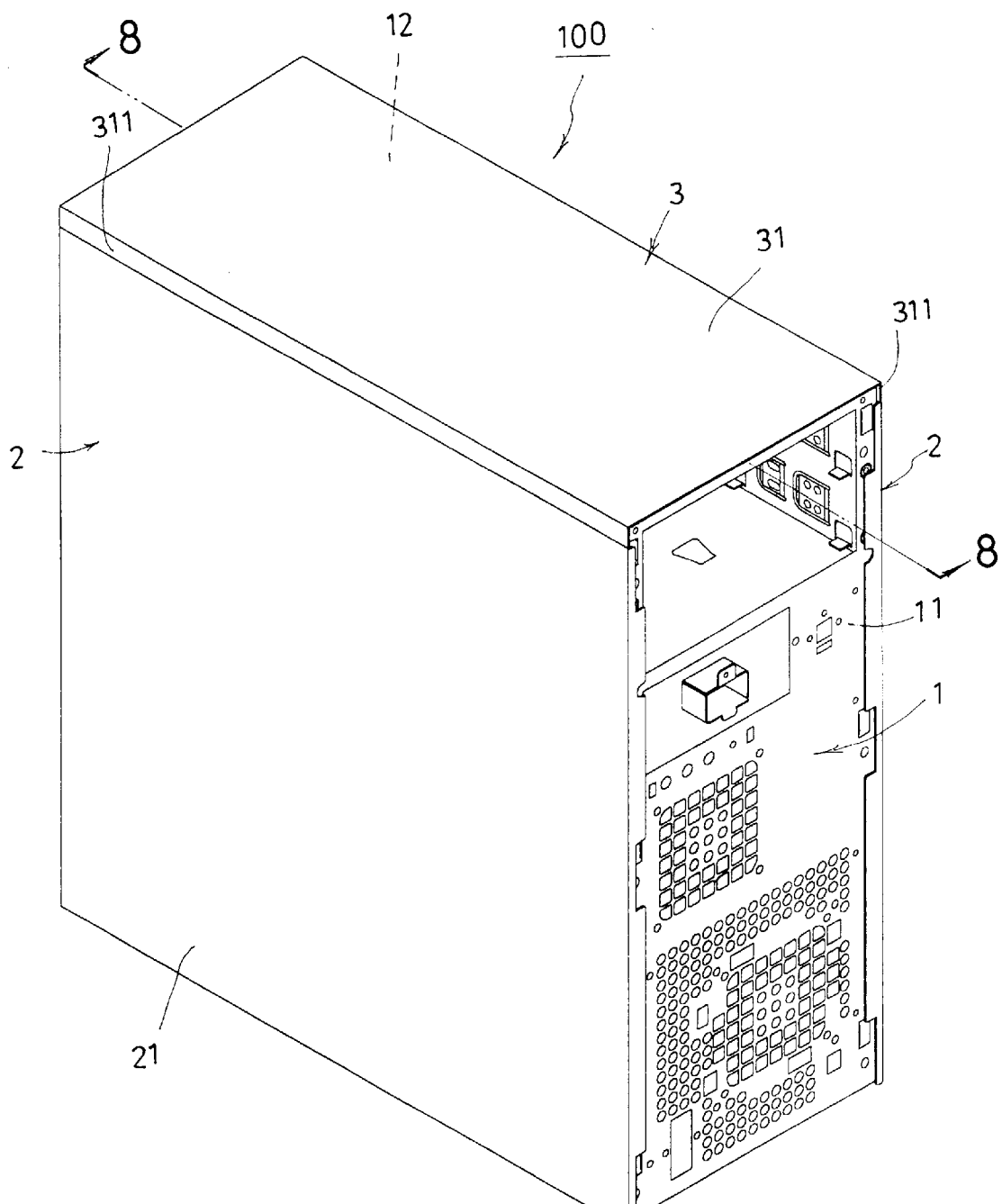
FIG. 4 is a perspective assembled view of the present invention.
Figure 5:
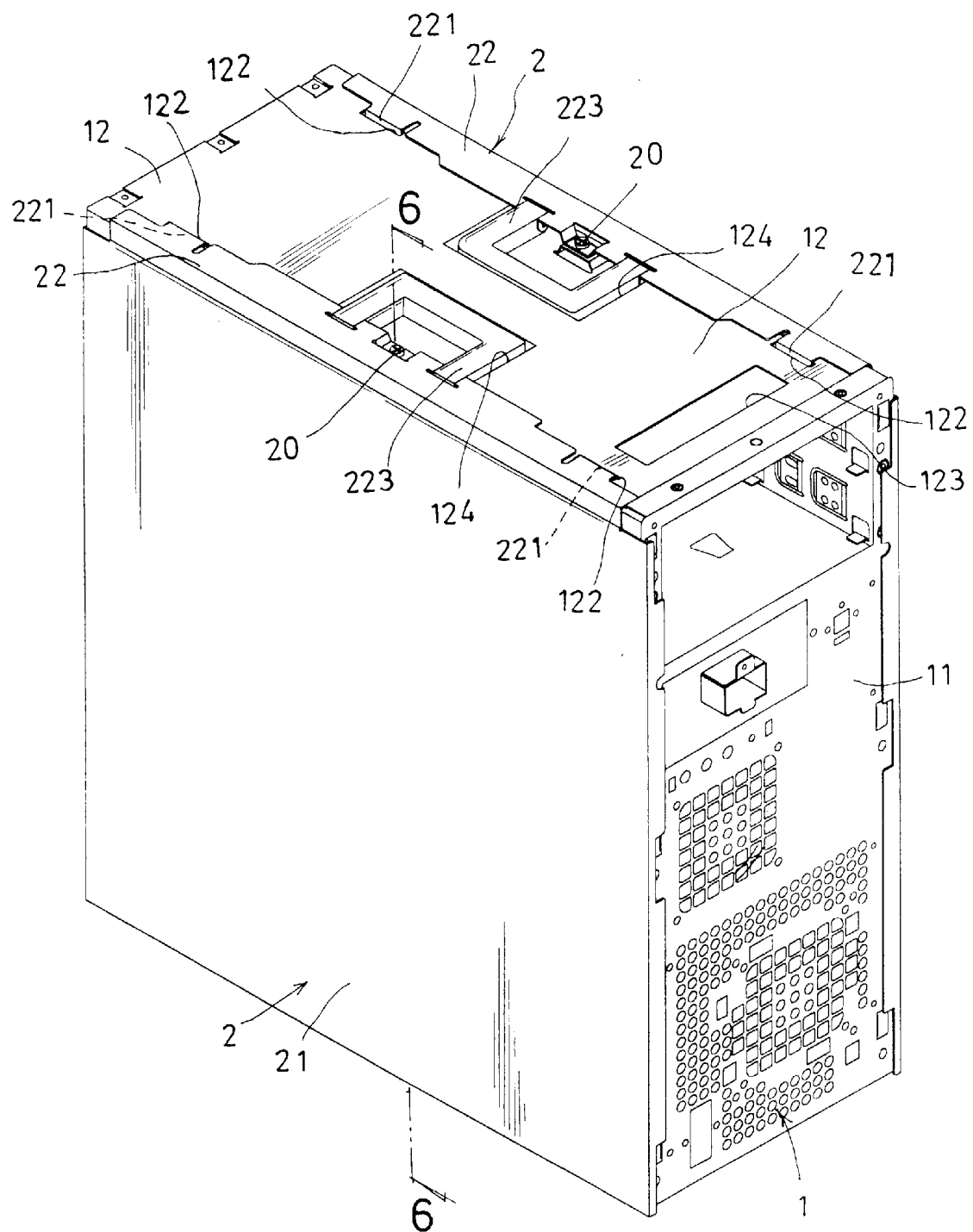
FIG. 5 is a perspective view according to FIG. 4, 5 in which the top cover board is disassembled.

When assembled, via the handle 223 pivotally connected with the lateral wall 2, an operator can hold and take the lateral wall 2 and align the latch hooks 211 thereof with the skirt sections 141 of the lower panel 14 of the base casing 1. Then the operator can slidably latch the latch hooks 211 with the skirt sections 141. In addition, the downward extending latch hooks 221 of the top end of the lateral wall 2 are hooked in the hook holes 122 of the upper panel 121. Then the operator can pass a fastening screw 20 through the coupling hole 224 of the top panel section 22 of the lateral wall 2 to lock the lateral wall 2 on the upper panel 12. At this time, the lateral walls 2 are firmly engaged with and locked on two sides of the base casing 1. The operator can then turn the handles 223 into the handle receptacles 124 of the upper panel 12 as shown in FIG. 5. Then the operator can slidably latch the top cover board 3 on the upper panel 12 to complete the assembling procedure as shown in FIG. 4.

When it is desired to expand, replace or service the equipments in the main frame housing 100, the top cover board 3 is disassembled and then the screws 20 for locking the lateral walls 2 with the base casing 1 are untightened. Then the handles 223 are turned out of the handle receptacles 124 for the operator to take the lateral walls 2 and disassemble the lateral walls 2 from the base casing 1.

According to the above arrangement, the present invention has the following advantages: in both assembling and disassembling procedures, an operator can hold the handles 223 of the lateral walls 2 so as to easily take the lateral walls 2. Therefore, the handles 223 facilitate the taking of the lateral walls 2 so that an operator can more conveniently and quickly assemble and disassemble the lateral walls.

It is to be understood that the above description and drawings are only used for illustrating one embodiment of the present invention, not intended to limit the scope thereof. Any variation and derivation from the above description and drawings should be included in the scope of the present invention.

What is claimed is:

1. An easily assembled/disassembled computer main frame housing, comprising:

a base casing formed as a hollow frame body by a front panel, an upper panel, a rear panel and a lower panel which are sequentially interconnected with each other, two sides of the upper panel being respectively formed with downward bent skirt sections and two sides of the lower panel being respectively formed with upward bent skirt sections, each side of the upper panel being formed with at least one hook hole;

two lateral walls, a bottom end of each lateral wall being disposed with multiple latch hooks extending both inwardly and downwardly for engaging with and embracing the skirt sections of the lower panel of the base casing, a top edge of each lateral wall being disposed with at least one downward extending latch hook for corresponding latching with the hook hole of a corresponding side of the upper panel, an edge of each lateral wall being pivotally connected with a handle, the two sides of the upper panel being respectively formed with two handle receptacles for respectively receiving therein the handles of the lateral walls; and, a top cover board, a bottom end of the top cover board being disposed with at least one latch plate for latching with the upper panel so as to prevent the lateral walls from being unlatched from the base casing.

2. An easily assembled/disassembled computer main frame housing, comprising:

a base casing formed as a hollow frame body by a front panel, an upper panel, a rear panel and a lower panel which are sequentially interconnected with each other, two sides of the upper panel being respectively formed with downward bent skirt sections and two sides of the lower panel being respectively formed with upward bent skirt sections, each side of the upper panel being formed with at least one hook hole;

two lateral walls, a bottom end of each lateral wall being disposed with multiple latch hooks extending both inwardly and downwardly for engaging with and embracing the skirt sections of the lower panel of the base casing, a top edge of each lateral wall being disposed with at least one downward extending latch hook for corresponding latching with the hook hole of a corresponding side of the upper panel, an edge of each lateral wall being pivotally connected with a handle; and, a top cover board, a bottom end of the top cover board being disposed with at least one first latch plate for latching with the upper panel so as to prevent the lateral walls from being unlatched from the base casing, the top cover board including a board body, each side of the board body being formed with a downward bent flange for embracing a respective one of the lateral walls, the at least one first latch plate being passed through a corresponding latch hole formed in the upper panel and slidably latched with an outer edge of the latch hole, the top cover board having a rear side with a downward extending tongue plate and at least one second latch plate extending inwardly from the tongue plate for insertion into a corresponding latch hole formed in the rear panel, the tongue plate being locked on the rear panel of the base casing by screws.

* * * * *